UNITED STATES PATENT OFFICE.

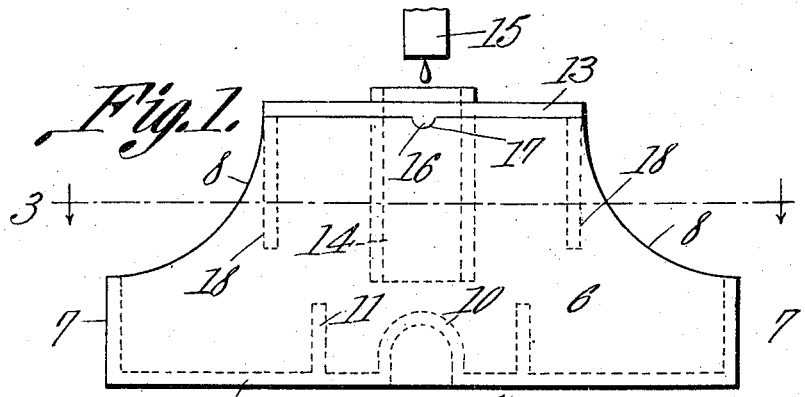
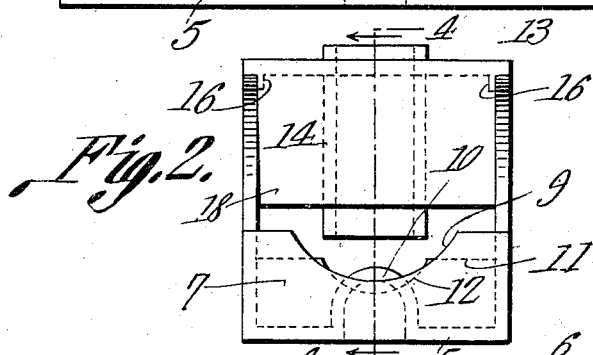
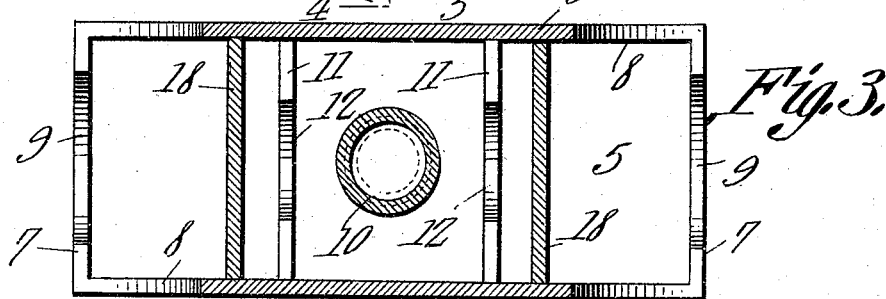
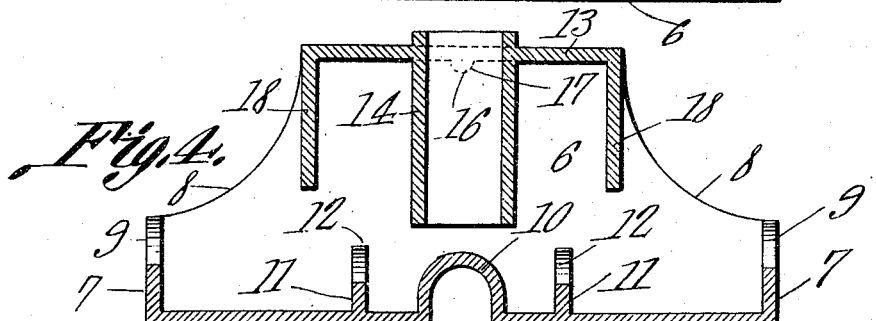

WALTER R. MONTGOMERY, OF SHREVEPORT, LOUISIANA.

LIQUID-FUEL BURNER.

966,575.  Specification of Letters Patent.  Patented Aug. 9, 1910.

Application filed May 20, 1910. Serial No. 562,460.

*To all whom it may concern:*

Be it known that I, WALTER R. MONT-GOMERY, a citizen of the United States, residing at Shreveport, in the parish of Caddo and State of Louisiana, have invented a new and useful Liquid-Fuel Burner, of which the following is a specification.

The burner which is the subject of the present invention belongs to the open pan or tray type, and it is designed more particularly for application to cooking stoves.

It is the object of the invention to provide a highly efficient burner of the kind stated which is economical in its consumption of fuel, and simple in construction, the entire burner structure comprising only two parts which are separably connected, so that access thereto may be readily had for cleaning and other purposes.

The invention also has for its object to provide a burner in which an abundant supply of air to support combustion is assured.

With these and other objects in view as will be apparent when the nature of the invention is better understood, the same consists of a novel construction and arrangement of parts to be hereinafter described and claimed, reference being had to the accompanying drawing, in which—

Figure 1 is a side elevation of the burner. Fig. 2 is an end view thereof. Fig. 3 is a horizontal section on the line 3—3 of Fig. 1. Fig. 4 is a longitudinal section on the line 4—4 of Fig. 2.

Referring more particularly to the drawing, 5 denotes the bottom of a pan. The side walls of the pan are indicated at 6, and the end walls at 7. This pan will be usually made rectangular in form as shown, to conform to the outline of the fire box of the stove. The side walls 6 are higher than the end walls 7, and said side walls are cut away at their ends in a curve down to the top edge of the end walls, as indicated at 8. The end walls 7 are recessed intermediate their ends as indicated at 9, the recesses being made in the top edges of said walls.

Rising from the bottom of the pan, on the inside thereof, is a fuel spreader 10, which is hollow as shown in Fig. 4 in order that it may be more quickly heated.

Rising from the bottom of the pan a suitable distance, and extending across the same on opposite sides of the spreader 10, are walls 11, the top edges of which are recessed intermediate their ends as indicated at 12.

The pan herein described is provided with a lid comprising a flat plate 13 seating on the top edges of the side walls 6, the ends of said plate extending no farther than the beginning of the cut away portion 8 of the side walls 6. At the center of the lid 13 is a draft tube 14 which is formed integral with the lid, and depends from the bottom thereof into the pan, the lower end of the tube extending to within a short distance of the spreader, and so located with respect to the spreader that the oil or other fuel passing through the tube may drop on the spreader. The upper end of the tube projects a short distance from the top of the lid, so that it may enter an opening in one of the lids of the stove to which the invention is applied. A fuel supply pipe 15 is located so as to discharge into the upper end of the tube 14, the fuel passing through the tube, and dropping on the spreader 10.

Intermediate the ends of the lid 13, on the bottom thereof, at opposite sides, are lugs 16 which seat in recesses 17 made in the top edges of the side walls 6, these lugs serving to hold the lid in proper position on the pan.

At the ends of the lid 13 are depending flanges 18 which form partitions extending across the pan between the side walls 6 thereof. These partitions do not extend downwardly as far as the bottom of the pan, their lower ends being located a short distance above the plane of the top edges of the end walls 7 of the pan.

The lid 13 is removably supported on the pan, so that all parts of the burner are readily accessible for cleaning and other purposes.

In operation, the burner being suitably supported in the fire box of the stove, oil or other liquid fuel is dropped into the pan through the tube 14. Inasmuch as the spreader 10 is located directly beneath the tube 14, the oil drops on the spreader, and flows down the sides thereof into the trough formed by the transverse walls 11 extending on opposite sides of the spreader. The oil is ignited in this trough, whereupon the spreader is rapidly heated, so that when the oil is again turned on and drops on the spreader, it is at once vaporized. The vapor is mixed with air entering the pan through the tube 14, whereby a highly combustible gas is formed which, upon being ignited, burns fiercely, the flames passing out of the pan through the open ends thereof. By cutting away the side walls of the pan as indicated at 8, the flames are permitted to rush out against each end of the fire box of the stove, and pass under each of the two front lids before passing out over the oven. This is to insure plenty of heat under each of the front lids for frying and boiling. The flames upon rising from the space inclosed by the walls 11 are deflected downwardly by the partitions 18, and then pass out of the pan across the top edges of the end walls 7. The partitions also serve to retain the heat in the burner, being located outside the walls 11, or in that portion of the pan between said walls and the end walls 7. The recesses 12 provide a further downward escape for the flames, causing them to shoot out against each end of the fire box of the stove. The recesses 9 are provided for the same purpose. The recesses also result in a saving of metal, thereby decreasing the cost of manufacture.

The arrangement of the several parts constituting the burner causes the heat to be confined for a greater length of time, thus effecting a saving of fuel.

What is claimed is:

1. A liquid fuel burner comprising a pan having its side walls higher than its end walls, said side walls being cut away adjacent to the end walls to provide for the escape of the products of combustion from the ends and the sides of the pan adjacent to said ends, a lid supported on the side walls, a tube opening through the lid, and depending into the pan, and a fuel supply pipe discharging through the tube into the pan.

2. A liquid fuel burner comprising a pan having its side walls higher than its end walls, said side walls being cut away adjacent to the end walls to provide for the escape of the products of combustion from the ends and the sides of the pan adjacent to said ends, a lid supported on the side walls of the pan, and a fuel supply pipe discharging through the lid into the pan.

3. A liquid fuel burner comprising a pan, a lid on the pan, and spaced from a portion thereof to provide for the escape of the products of combustion, partitions in the pan extending from the lid, and spaced from the bottom of the pan, said partitions extending in front of the escape openings for the products of combustion, transverse walls rising from the bottom of the pan, the partitions being located in that portion of the pan which is between the transverse walls and the escape openings, and a fuel supply pipe discharging through the lid into the pan between the transverse walls.

4. A liquid fuel burner comprising a pan having end walls which have their top edges recessed, a lid covering the pan, said lid being spaced from the end walls to permit the escape of the products of combustion over said walls, partitions extending from the lid into the pan, and spaced from the bottom thereof, transverse walls rising from the bottom of the pan, the top edges of said walls being recessed, said last mentioned recesses being in line with the recesses of the end walls, the aforesaid partitions being located in that portion of the pan which is between the end and transverse walls, and a fuel supply pipe discharging through the lid into the pan between the transverse walls.

In testimony that I claim the foregoing as my own, I have hereto affixed my signature in the presence of two witnesses.

WALTER R. MONTGOMERY.

Witnesses:
    F. G. THATCHER,
    A. D. KEENEY.